Aug. 5, 1952           B. VONNEGUT           2,606,270
CONDENSATION NUCLEI GENERATOR
Filed Oct. 28, 1950
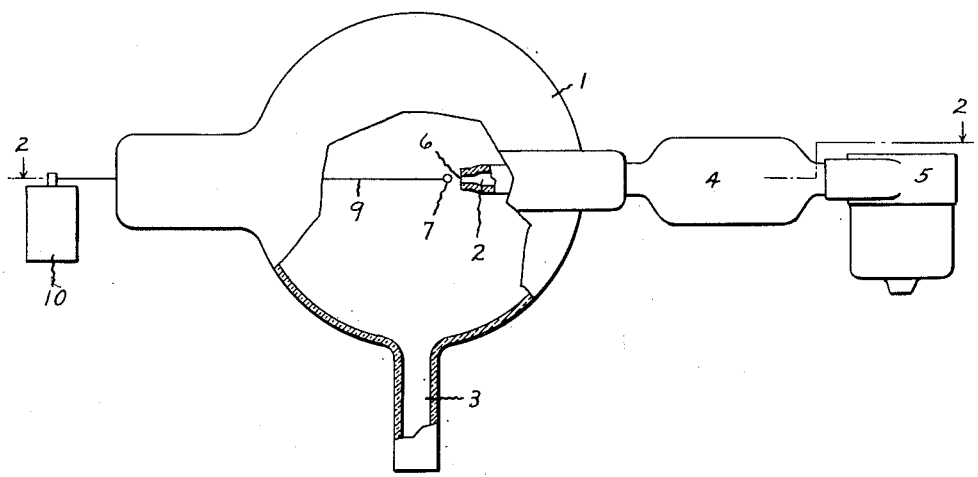
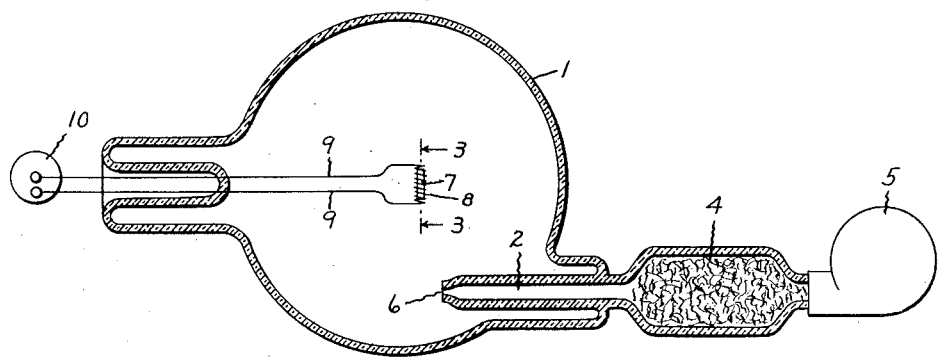
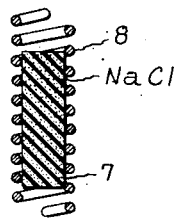
Inventor
Bernard Vonnegut
Paul A. Frank
by           His Attorney Patented Aug. 5, 1952

2,606,270

UNITED STATES PATENT OFFICE 2,606,270

CONDENSATION NUCLEI GENERATOR

Bernard Vonnegut, Alplaus, N. Y., assignor to General Electric Company, a corporation of New York Application October 28, 1950, Serial No. 192,723

3 Claims. (Cl. 219—19)

This invention relates to improvements in condensation nuclei generators, and in particular to an improved generator which provides a constant and reproducible source of condensation nuclei.

The atmosphere is normally found to contain large numbers of suspended particles which can serve as centers for the condensation of water drops. These particles are called condensation nuclei. The suspended particles which serve as nuclei for water drop condensation may be exceedingly small, perhaps 50 Angstrom units in diameter. Under some conditions, the nuclei may even be of atomic dimensions.

In my copending application, S. N. 129,091, filed November 23, 1949, and assigned to the same assignee as the present application, a condensation nuclei meter is described which measures relative concentrations of condensation nuclei in the atmosphere. In order to determine the performance of a nuclei meter of this sort, and to calibrate the meter, it is desirable to have a constant and reproducible source of condensation nuclei.

An object of this invention is to provide an improved condensation nuclei generator, for evaluating the stability and sensitivity of condensation nuclei meters, and for other purposes.

Other objects and advantages of the invention will appear as the description proceeds.

The features of this invention which are believed to be novel and patentable are pointed out in the claims which form a part of this specification. For a better understanding of the invention, reference is made in the following description to the accompanying drawing in which Fig. 1 is a partly schematic elevation, partly in section, of an improved condensation nuclei generator, Fig. 2 is a section along line 2—2 of Fig. 1, and Fig. 3 is an enlarged fragmentary section taken along line 3—3 of Fig. 2.

Referring to the drawing, the improved condensation nuclei generator preferably comprises a globular glass container 1 having an inlet opening 2 and an outlet opening 3. A filter 4 attached to the inlet opening may comprise a tube, preferably about 10" long and about 1" in diameter, filled with glass wool. Means such as pump 5 is provided to force air, or other gas, through filter 4 and inlet opening 2 into container 1. The inlet opening has a nozzle with an orifice 6 positioned as shown in the drawing to direct the entering air tangentially into container 1. Air leaves the container through outlet opening 3. Container 1 may be a glass bulb about 5" in diameter, and orifice 6 may be proportioned to provide an air flow of about .36 cubic feet per minute when air is supplied to the orifice by pump 5 at a constant pressure of 4.0 centimeters of mercury.

Near the center of container 1 is a small pellet 7, preferably a cylinder of pressed sodium chloride about 1/8" in diameter and 3/8" long. Wound about this pellet and supporting it within the container is a heating coil 8, preferably made of platinum wire. Leads 9 extend from the heating coil through the wall of container 1. Suitable means, such as battery 10, is provided to supply electric current through heating coil 8 sufficient to heat the sodium chloride cylinder to a dull red heat, which is far below the melting point of the sodium chloride. At this temperature, the salt evaporates and condenses to form large numbers of condensation nuclei. These particles mix thoroughly with the air entering the apparatus, and the resultant invisibly fine smoke leaves the bulb from opening 3 at the bottom of container 1. Since the condensation nuclei initially present in the atmosphere are removed as the air passes through filter 4, only the nuclei produced by evaporation of the sodium chloride cylinder are present in the air which leaves container 1 through outlet opening 3. When constant voltage is applied to the heating coil, the sodium chloride is heated to a substantially constant temperature, and the generation of nuclei is constant and reproducible.

A generator of the type described has been tested with a nuclei meter. For three days of continuous operation, the record of the meter remained substantially constant. After about three days, the meter readings began to decrease slowly, because of changes in shape of the salt cylinder through evaporation from the hot portion near the platinum wires and condensation on the cold portion between the windings. Thus, the improved generator acted as a constant and reproducible source of condensation nuclei for about 72 hours of operation. The generator may be renewed for further operation by replacing the sodium chloride cylinder.

Having described the principle of this invention in the best mode in which I have contemplated applying that principle, I wish it to be understood that the example described is illustrative only, and that other means may be employed without departing from the true scope of the invention.

What I claim as new and desire to secure by Letters Patent of the United States is:

1. A condensation nuclei generator comprising a container having inlet and outlet openings, a filter connected to said inlet opening, means to force a gas into said container through said filter and said inlet opening, a salt pellet within said container, and electrical means to heat said pellet to evaporate a portion of the pellet.

2. A condensation nuclei generator comprising a container having inlet and outlet openings, a filter connected to said inlet opening, means to force air into said container through said filter and said inlet opening, a cylindrical pellet of sodium chloride within said container, an electrical heating coil wound about said pellet, and means to supply electric current to said coil to heat said pellet to evaporate a portion of the pellet.

3. A condensation nuclei generator comprising a globular glass container having inlet and outlet openings, a filter connected to said inlet opening, said filter consisting of a long tube filled with glass wool, means to force air into said container through said filter and said inlet opening, said inlet opening having an orifice positioned to direct the entering air tangentially into said container, a cylindrical pellet of pressed sodium chloride, a heating coil wound about said pellet and supporting the pellet within said container, and means to apply electric current to said heating coil to heat said pellet to a dull red heat, to evaporate a portion of the pellet without melting the sodium chloride.

BERNARD VONNEGUT.

REFERENCES CITED

The following references are of record in the file of this patent:

UNITED STATES PATENTS

| Number | Name | Date |
| --- | --- | --- |
| 984,047 | Touzalin | Feb. 14, 1911 |
| 1,286,135 | Somermeier | Nov. 26, 1918 |
| 1,824,585 | Wolcott et al. | Sept. 22, 1931 |
| 2,239,452 | Williams et al. | Apr. 22, 1941 |
| 2,324,787 | Lundgren | July 20, 1943 |
| 2,363,555 | Saslaw | Nov. 28, 1944 |
| 2,426,016 | Gustin et al. | Aug. 14, 1947 |
| 2,440,135 | Alexander | Apr. 20, 1948 |
| 2,551,341 | Scheer et al. | May 1, 1951 |